United States Patent
Duval

(10) Patent No.: US 12,267,416 B2
(45) Date of Patent: *Apr. 1, 2025

(54) ONBOARDING SOFTWARE ON SECURE DEVICES TO GENERATE DEVICE IDENTITIES FOR AUTHENTICATION WITH REMOTE SERVERS

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/403,778

(22) Filed: Aug. 16, 2021

(65) Prior Publication Data

US 2021/0377004 A1 Dec. 2, 2021

Related U.S. Application Data

(63) Continuation of application No. 16/374,905, filed on Apr. 4, 2019, now Pat. No. 11,101,984.

(51) Int. Cl.
*H04L 9/08* (2006.01)
*H04L 9/32* (2006.01)

(52) U.S. Cl.
CPC ............ *H04L 9/083* (2013.01); *H04L 9/0825* (2013.01); *H04L 9/3236* (2013.01); *H04L 9/3263* (2013.01)

(58) Field of Classification Search
CPC ..... H04L 9/083; H04L 9/0825; H04L 9/3236; H04L 9/3263
See application file for complete search history.

(56) References Cited

U.S. PATENT DOCUMENTS 9,430,658 B2 * 8/2016 Covey .................. G06F 9/4401
10,439,816 B2 * 10/2019 van der Maas ....... H04L 9/0894
(Continued)

FOREIGN PATENT DOCUMENTS

CN 103825741 5/2014
CN 105790938 7/2016
(Continued)

OTHER PUBLICATIONS

Google translation of KR20150083179A published on Jul. 17, 2015, 19 pages (Year: 2015).*

(Continued)

*Primary Examiner* — Oleg Korsak
(74) *Attorney, Agent, or Firm* — Greenberg Traurig

(57) ABSTRACT

Systems, methods and apparatuses to configure a computing device for identification and authentication are described. For example, a key management server (KMS) has a certificate generator and is coupled to a registration portal. A copy of secret implemented into a secure component during its manufacture in a factory is stored in the KMS. After leaving the factory, the component can be assembled into the device. The portal receives registration of the component and a hash of software of the device. The certificate generator generates, independent of the device, public keys of the device, using the copy of the secret stored in the KMS and hashes of the software received via the registration portal, and then sign a digital certificate of the public key of the device. Authentication of the device can then be performed via the private key of the device and the certified public key.

20 Claims, 7 Drawing Sheets

(56) References Cited

U.S. PATENT DOCUMENTS

| | | |
|---|---|---|
| 10,749,680 B1 | 8/2020 | Troia et al. |
| 11,101,984 B2 | 8/2021 | Duval |
| 2006/0013402 A1 | 1/2006 | Sutton, II et al. |
| 2006/0117181 A1 | 6/2006 | Brickell |
| 2007/0223704 A1 | 9/2007 | Brickell et al. |
| 2008/0320308 A1 | 12/2008 | Kostiainen et al. |
| 2010/0325704 A1 | 12/2010 | Etchegoyen |
| 2011/0173684 A1 | 7/2011 | Hurry et al. |
| 2011/0219232 A1 | 9/2011 | Yamaguchi et al. |
| 2012/0331287 A1 | 12/2012 | Bowman et al. |
| 2013/0007443 A1 | 1/2013 | Grab et al. |
| 2014/0114497 A1 | 4/2014 | Miyake |
| 2014/0189890 A1 | 7/2014 | Koeberl et al. |
| 2014/0317417 A1 | 10/2014 | Ashkenazi |
| 2014/0365763 A1 | 12/2014 | Manohar et al. |
| 2015/0244709 A1 | 8/2015 | Goldman |
| 2016/0171223 A1* | 6/2016 | Covey .................. G06F 21/572 713/189 |
| 2017/0111177 A1 | 4/2017 | Oguma et al. |
| 2017/0244562 A1 | 8/2017 | He |
| 2017/0302459 A1 | 10/2017 | Fenner et al. |
| 2017/0366359 A1 | 12/2017 | Scarlata et al. |
| 2018/0039795 A1 | 2/2018 | Gulati |
| 2018/0167208 A1 | 6/2018 | Le Saint et al. |
| 2018/0351948 A1* | 12/2018 | De Jong ............... H04L 9/0866 |
| 2018/0375667 A1 | 12/2018 | Sovio et al. |
| 2019/0007220 A1 | 1/2019 | Falk |
| 2019/0052464 A1* | 2/2019 | Doliwa ................. H04L 9/3213 |
| 2019/0087577 A1* | 3/2019 | Doliwa ................... G06F 21/44 |
| 2020/0021431 A1 | 1/2020 | Mondello et al. |
| 2020/0021981 A1 | 1/2020 | Mondello et al. |
| 2020/0193065 A1* | 6/2020 | Smith .................. H04L 9/3242 |
| 2020/0322134 A1 | 10/2020 | Duval |

FOREIGN PATENT DOCUMENTS

| | | |
|---|---|---|
| JP | 2008185616 | 8/2008 |
| WO | 2017153990 | 9/2017 |
| WO | 2017153990 A1 | 9/2017 |

OTHER PUBLICATIONS

International Search Report and Written Opinion, PCT/US2020/021824, mailed Jul. 6, 2020.

J. Israelsohn, "Components of Risk: Counterfeit Electronic Parts", Electronic Component News, Apr. 2015.

R. Aigner, P. England, K. Kane, A. Marochko, D. Mattoon, R. Spiger, S. Thom, and G. Zaverucha: Device Identity with DICE and RIoT Keys and Certificates, Sep. 2017.

Trusted Computing Group, Trusted Platform Architecture Hardware Requirements for a Device Identifier Composition Engine, Dec. 16, 2016.

Extended European Search Report, EP20783569.5, mailed on Nov. 16, 2022.

Esposito, Christian, "Integrity for an Event Notification Within the Industrial Internet of Things by Using Group Signatures." IEEE Transactions on Industrial Informatics, IEEE, Jan. 11, 2018.

Qiu, Chenggang, et al., "A certified encryption scheme based on public key self-proof." Computing and Information Technology, Abstract only, Jan. 20, 2007.

Zhang, Xin, et al., "Trusted Property Remote Attestation Based on ABS." Advanced Engineering Sciences, Abstract only, Jun. 30, 2017.

* cited by examiner

ONBOARDING SOFTWARE ON SECURE DEVICES TO GENERATE DEVICE IDENTITIES FOR AUTHENTICATION WITH REMOTE SERVERS

RELATED APPLICATIONS

The present application is a continuation application of U.S. patent application Ser. No. 16/374,905 filed Apr. 4, 2019, issued as U.S. Pat. No. 11,101,984 on Aug. 24, 2021, the entire disclosure of which application is hereby incorporated herein by reference.

FIELD OF THE TECHNOLOGY

At least some embodiments disclosed herein relate to identification and authentication of computing devices.

BACKGROUND

With the recent increase of low-cost devices connected to cloud servers, commonly referred to as Internet of Things (IoT), new security challenges have risen, including the unique identification of IoT devices and the authentication of their identities to reject counterfeit devices.

Some authentication techniques in computer security can be used by one entity to verify the identity of another entity. For example, a secret can be used as part of the identity of the entity; and the ability of an entity to show that it is in possession of the secret can be used as a way to authenticate the identity of the entity. Such a secret can be used as a password, a pin, or an encryption key in an authentication process. Combining multiple roots-of-trust factors that are difficult to replicate can increase the likelihood that the identities asserted by IoT devices are valid.

Public-key cryptography, or asymmetric cryptography, is a cryptographic system used in many authentication techniques. Such a cryptographic system can generate a pair of asymmetric keys together, such that it is not practical to derive one of the keys from the other in the pair. A message encrypted using one key in the pair cannot be decrypted using that key itself, but can only be decrypted using the other key in the pair. The system is asymmetric in that different keys are used for encryption and decryption. One of the keys in a pair can be published as a public key; and the other key can be kept as a secret, or private key. Demonstrating the possession of the private key can be used as a way to identify and/or authenticate the entity that has the private key. For example, the private key can be used to sign a message. The public key can be used to verify that the signature included in the message corresponds to the original message and thus that the message has been generated using the corresponding private key. For example, the private key can be used to create a digital signature for a message by computing a cryptographic hash of the message. When the computed hash matches with the hash recreated from the message, it can be concluded that the message has not been altered in view of the digital signature and, the digital signature is signed by the entity in possession of the private key.

Some authentication techniques use secrets embedded in the hardware to derive keys for identification and/or authentication. Such hardware based secrets are difficult to steal or replicate.

In addition of storing secrets, discrete hardware security components can be configured to perform cybersecurity tasks, thus offloading the workload from the host CPU (Central Processing Unit) and isolating sensitive operations from potentially compromised applications running on the host CPU. For example, one of such security components is Trusted Platform Module (TPM), which can securely store secrets and plays a role in verifying the integrity of critical boot software.

Some authentication techniques use a combination of secrets embedded in the hardware and the data of software, such as boot loader source code to create highly trustworthy identities for low-cost devices.

A device identity composition engine (DICE) according to a standard developed by the Trusted Computing Group (TCG) is a standardized technique to combine hardware secrets and source code to create trustworthy identities.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
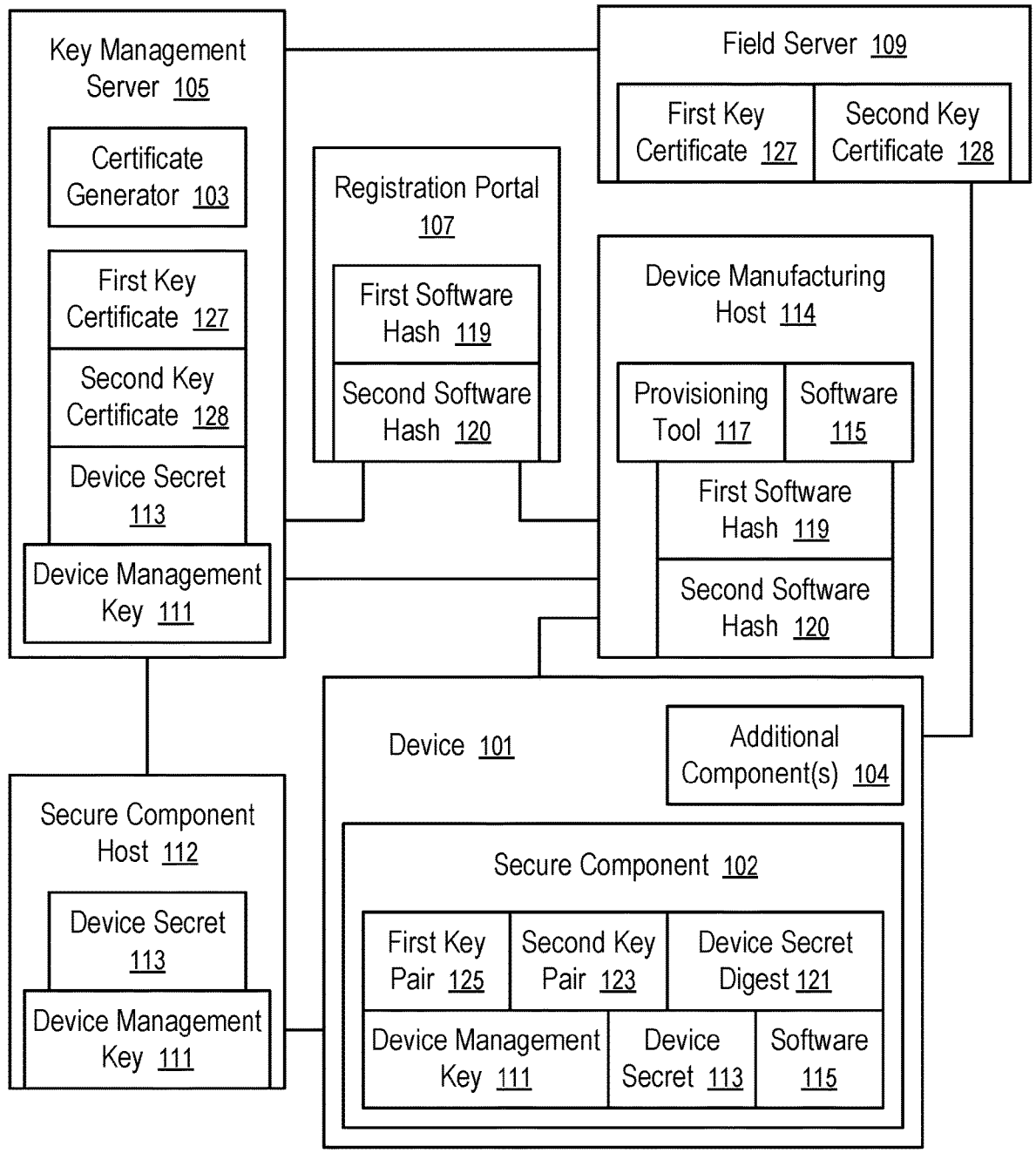
FIG. 1 shows a system to identify a device for authentication according to one embodiment.

At least some embodiments disclosed herein provide techniques to configure a computing device to be identified via hardware and software such that the computing device can be uniquely identified for authentication in accessing a remote server, with reduced risk of the identity of the computing device being stolen or replicated for counterfeit devices. For example, the techniques can be used for multi-factor authentication of devices processed in a semiconductor supply chain at a lower cost and faster than with solutions where each individual device needs to onboard itself.

Specifically, the techniques simplify secure exchange of information between computer systems to enable computing devices to later authenticate their identity to remote servers. The techniques include strong authentication mechanisms that rely on a combination of the secret injected into components of computing devices at factory and a cryptographic function (e.g., hash) of the software installed for the computing devices later after the components leave the factory.

For example, a manufacturer of secure hardware components can inject secrets into the hardware components at factory, without the knowledge of the software content that will later be installed on the secure hardware components. A provisioning tool can be configured to properly install the software content on the hardware components and produce cryptographic side-information (e.g., hash) about the software content. The cryptographic side-information can be safely shared with a remote portal. The cryptographic side-information can be common to many computing devices that are configured to use the same version of the software content installed in respective secure hardware components of the computing devices. Thus, a single upload of the cryptographic side-information can be sufficient for the population of the computing devices having different identities but use the same version of the software content. The cryptographic side-information allows the implementation of multi-factor authentication of the computing devices to a remote server, wherein secure hardware components of the computing devices have different secrets injected therein at factory and having the software content installed therein after leaving the factory. The techniques eliminate the need for the remote server to connect to each individual device to configure the device for a separate identity.

In at least one authentication mechanism disclosed herein, multiple factors for authentication are combined to prevent malicious actors from impersonating valid computing devices. For example, the multiple factors for authentication can include a secret implemented in one hardware component in a semiconductor manufacturing plant. The secret is unique to the hardware component amount hardware components produced in the semiconductor manufacturing plant. Thus, the secret can be used to uniquely identify the hardware component.

After such a hardware component leaves the semiconductor manufacturing plant for being integrated/assembled into a computing device, software content can be installed on the hardware component for the operation of the computing device. Different device manufacturers can install different software contents for their computing devices. In order for a remote host to verify the authenticity of such a computing device, the multiple factors for authentication can further include non-sensitive data about the software content installed in the hardware component, such as a cryptographic hash of the source code of the software.

In one example, a system configured to implement the techniques can include a provisioning tool, a registration portal, and a cloud certificate generator.

The provisioning tool can be used by a device manufacturer to generate a set of commands to configure computing devices for identity and key generation.

The registration portal can be configured to receive non-sensitive data about software content installed in the computing devices. When the hardware components of the computing devices are registered with the registration portal, the non-sensitive data about the software content installed, or to be installed, in the hardware components can be associated with registered the hardware components. For example, a copy of the non-sensitive data about the software content can be uploaded to the registration portal as part of the registration process. A single upload can be sufficient for multiple devices sharing the same software implementation.

The computing devices can implement a security feature to generate an asymmetric key pair from the non-sensitive data about the software content and the secret implemented in the hardware component. This security feature can be implemented in accordance with a standard for Device Identity Composition Engine/Robust Internet of Things (DICE/RIoT).

The cloud certificate generator of a key management server (KMS) can be configured with the capability of emulating the asymmetric keys generation of such a computing device. The cloud certificate generator can produce the same asymmetric keys of the computing device that would be created on the computing device configured using the same set of commands. The cloud certificate generator is configured to generate a certificate for a public key of the computing device, such as the public key in an alias key pair of the computing device, or the public key in a device identity key pair of the computing device.

For example, the key generation feature of the computing device allows the computing device to compute a first digest of the unique device secret and one first portion of software every time the device boots. This digest can be labelled the composite device identifier (CDI) according to a DICE standard. The CDI can then be used in a program running at boot time on the host CPU to generate asymmetric key pairs. This program can be labelled as Robust Internet of Things, or RIoT. The RIoT program can derive a first asymmetric key pair from the CDI and a cryptographic hash of a second portion of source code (e.g., source code of boot loader). This asymmetric key pair can be labelled the alias key pair. A second key pair can be generated from the CDI, but independent of the second portion of source code. This second key pair can be labelled the device identification key pair. The alias key pair can be used to authenticate the device. For example, the device can digitally sign data using the private key in the alias key pair; and the digital signature can be verified using the public key in the alias key pair to verify that the device is in possession of the private key in the alias key pair. The device identification key pair can be used for operations and management, such as the replacing of the alias key pair. If the second portion of source code needs to change, as a result of a legitimate software update, then the RIoT program can produce a certificate of the new alias key resulting from the updated software. This certificate is signed with the device identification private key, thus allowing a peer to authenticate the validity of the new alias public key.

For example, a factory of secure hardware components can be configured to produce a secure hardware component, such as a secure flash memory component. The factory can inject secret information, such as device secret and a device management key, in the secure hardware component during the manufacturing process of the component. In some cases, the device secret can be labelled the unique device secret (UDS). The factory is configured to upload copies of the secret information to the key management server (KMS).

A device manufacturer may integrate the secure hardware component into a computing device produced by the device manufacturer. The device manufacturer can design embedded software for the computing device and use the provisioning tool to calculate non-sensitive data about the software, such as a cryptographic hash of the software. Additionally, the device manufacturer can use the provisioning tool to load software at the appropriate location in the hardware component and configure the hardware component to produce the appropriate cryptographic calculations to generate the key pairs.

Using the registration portal, the device manufacturer registers the secure hardware components that are assembled into the computing devices produced by the device manufacturers. For example, the registration can be performed as part of the process of ordering or purchasing the secure hardware components manufactured by the factory of the secure hardware components.

The device manufacturer can upload to the registration portal the non-sensitive data about the software identified by the provisioning tool. Additionally, the device manufacturer can upload information about the field servers to which the devices will be onboarded and that will receive certificates. In response, the registration portal can request the cloud certificate generator to generate certificates for the public keys of the registered secure hardware components.

In response to the request from the registration portal, the cloud certificate generator can retrieve the previously stored device secret of the manufactured secure hardware components, emulate the key generation feature of the secure hardware components, compute the key pairs of the secure hardware components in the same way as the secure hardware components computing their key pairs, and sign certificates for the public keys of the key pairs (e.g., without storing the private keys).

The cloud certificate generator can provide the certificates to the field servers of the device manufacturer and use the device management keys to manage the secure hardware components and enable the security features of the secure hardware components.

When a computing device produced by the device manufacturer is connected to a field server of the device manufacturer (or another server with knowledge of the alias key certificate), the computing device can use a private key for authentication. The field server can use the corresponding public key, certified by the cloud certificate generator to verify that the computing device is in possession of the corresponding private key and thus has the identity associated with the certification of the public key.

FIG. 1 shows a system to identify a device (101) for authentication according to one embodiment.

In FIG. 1, the device (101) has a secure component (102) that is configured to securely store at least a secret, such as device secret (113), etc. The secure component (102) can also store a device management key (111) to allow an entity in possession of a copy of the device management key (111) to manage the secure component (102), such as turn on a security feature of the secure component (102).

The secure component (102) can have a device secret digest (121), which can be generated according to a DICE/RIoT standard, based on the device secret (113) and the software (115). The device secret digest (121) can be used to generate asymmetric key pairs, such as a first key pair (125) and a second key pair (123).

The device (101) can include one or more additional component(s) (104) that are connected to the secure component (102) to provide the functionality of the device (101) in connection with the software (115).

The system of FIG. 1 includes a key management server (105) that has a certificate generator (103). The certificate generator (103) is configured with the capability of emulating the feature of the device (101) in generating the asymmetric key pairs.

For example, a set of commands can be executed in the device (101) to generate the device secret digest (121) from the device secret (113) stored in the secure component (102) of the device (101) and from a first cryptographic hash (e.g., 119) of the software (115). The execution of the set of commands can further generate an asymmetric key pair, such as the first key pair (125) or the second key pair (123). The certificate generator (103) is configured to use the same set of commands to generate the device secret digest (121) from the copy of the device secret (113) stored in the key management server (105) and from the cryptographic hashes (e.g., 119 and 120) of the software (115) received from a registration portal (107). Similarly, the set of commands executed in the certificate generator (103) can generate the corresponding asymmetric key pair, such as the first key pair (125) or the second key pair (123), such that the certificate generator (103) can digitally sign a certificate for the public key in the corresponding asymmetric key pair, using a private key of the certificate generator (103) or the key management server (105). The authenticity of the certificate can be verified via the public key of the certificate generator (103). Thus, a field server (e.g., 109) that trusts the certificate generator (103) or the key management server (105) can trust the authenticity of the public key having the certificate signed by the certificate generator (103).

Once a public key of the device (101) is certified, the device (101) can use the corresponding private key to authenticate itself to a field server (e.g., 109). For example, the device (101) can digitally sign a message using the private key. If the public key that is certified to be associated with a private key of the device (101) can be used to verify the digital signature, the device (101) can be considered to have in possession of the private key and/or the identity specified in the certificate signed for the public key.

The system of FIG. 1 allows the device (101) to be loaded with software using a device manufacturing host (114) at a time and location different from the implementation of the secrets in the secure component (102) using a secure components host (112) (e.g., device management key (111) and device secret (113)), as further discussed below in connection with FIGS. 2-5.

FIGS. 2-5 illustrate a process to onboard software (115) on a computing device (101) (e.g., as illustrated in FIG. 1) with a configuration for secure authentication of the device (101) in accessing a remote server (e.g., 109).

Figure 2:
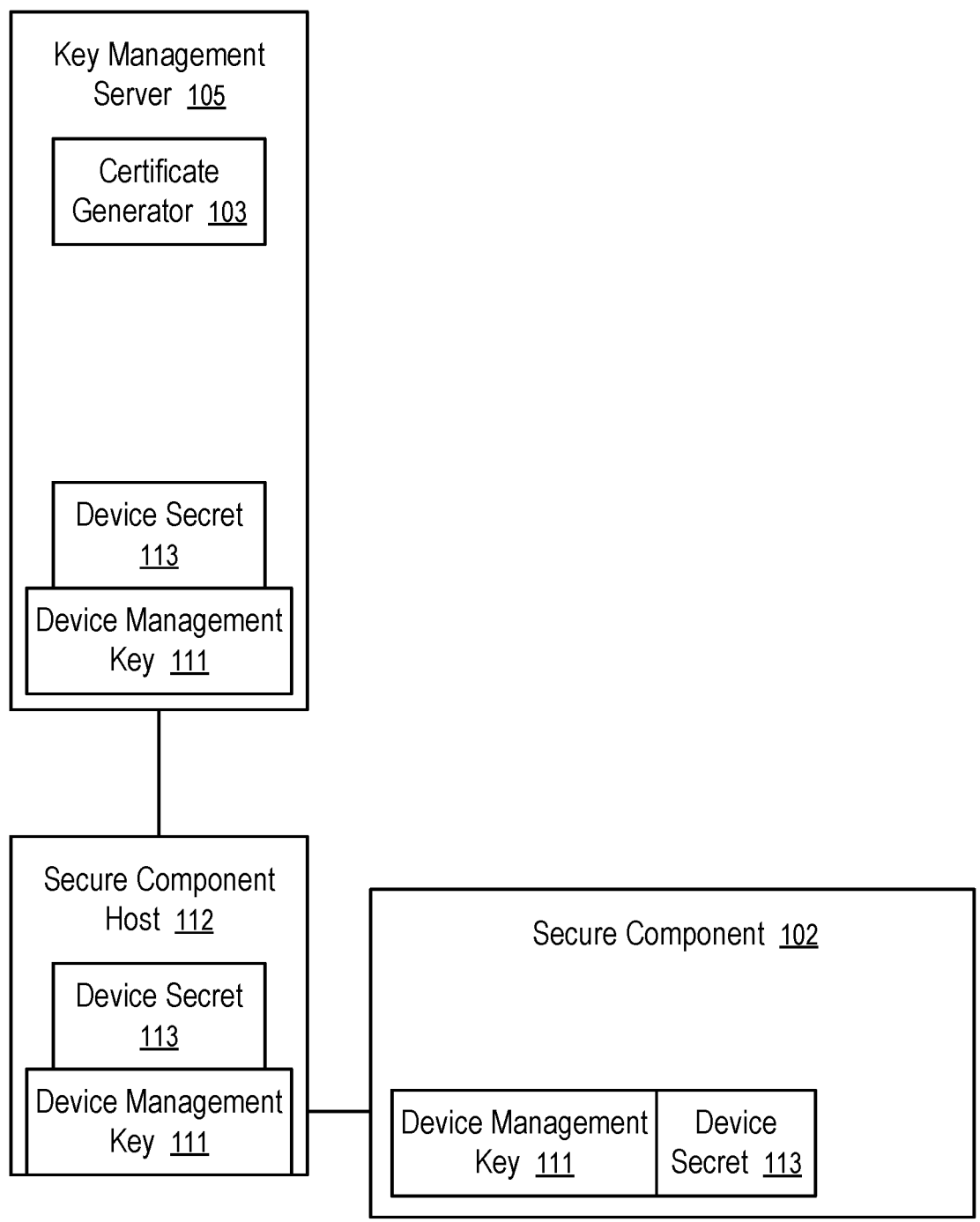
FIGS. 2-5 illustrate a process to onboard software on a device with a configuration for secure authentication of the device in accessing a remote server.

In FIG. 2, a secure component (102) is configured in a factory without any knowledge or access to software (115) that may be subsequently developed and/or installed in a computing device (101) that uses the secure component (102).

When the secure component (102) is the factory, secrets (e.g., device management key (111) and device secret (113)) of a first root-of-trust are injected into the secure component (102) from a secure component host (112). The same host (112) uploads a copy of the secrets to the key management server (105) (e.g., with an identification of the secure component (102)) via a secure connection between the host (112) and the key management server (105).

Figure 3:
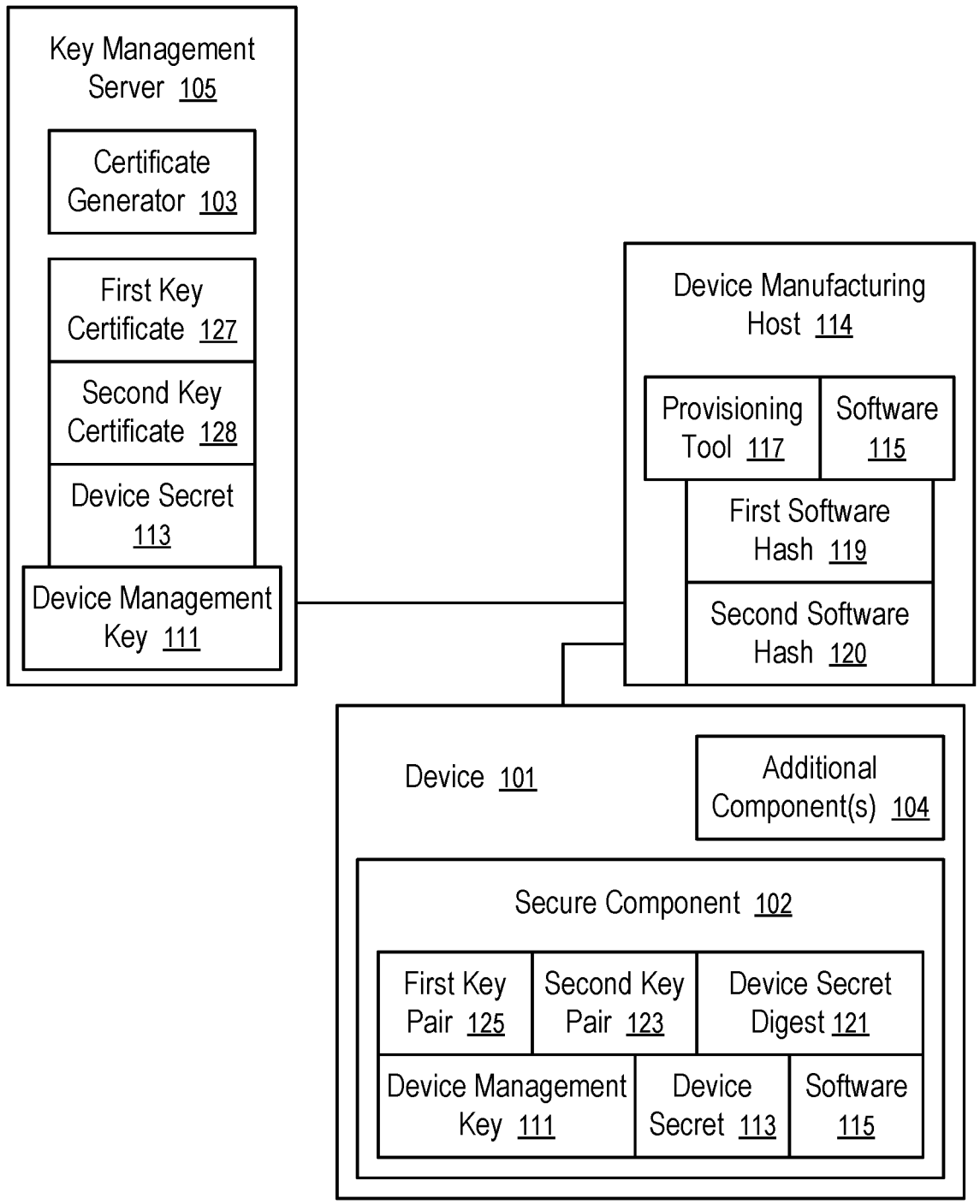

In FIG. 3, a device manufacturer develops a design of the computing device (101) that integrates the secure component (102) and additional components (104). The software (115) for operating the computing device (101) becomes available at the facility (e.g., device manufacturing host (114)) of the device manufacturer. A provisioning tool (117) can be used to install the software (115) at the appropriate location in the secure component (102) and generate a hash of a first portion of the software (119) and a hash of a second portion of the software (119). The hashes (119 and 120) will be used in the key management server (105) in generating a first key certificate (127) and a second key certificate (128).

In FIG. 3, the device manufacturing host (114) can also use the provisioning tool (117) and the device management key (111) to provision, and therefore activate the secure component (102) on the device (101). The device management host (114) can make one or more requests to the key management server (105): transfer the device management key (111) to the device manufacturing host (114) or directly sign commands to be sent to the secure component (102). In either case, the provisioning tool (117) provides the same configuration parameters used to provision the secure component (102).

In FIG. 3, after the provisioning tool (117) has conducted both provisioning operation and software installation operation, the secure component (102) and additional components (104) produces key pairs (123 and 125) based on the same software hashes (119, 120) as the certificate generator (103) located on the key management server (105). In more details, the secure component (102) internally produces the device secret digest (121) based on the device secret (113) and a first software hash (119) calculated independently from the provisioning tool (117), and then the additional component (104) produces key pairs (123, 125) based on the device secret (113) and the second software hash (120), also calculated independently from the provisioning tool (117).

Figure 4:
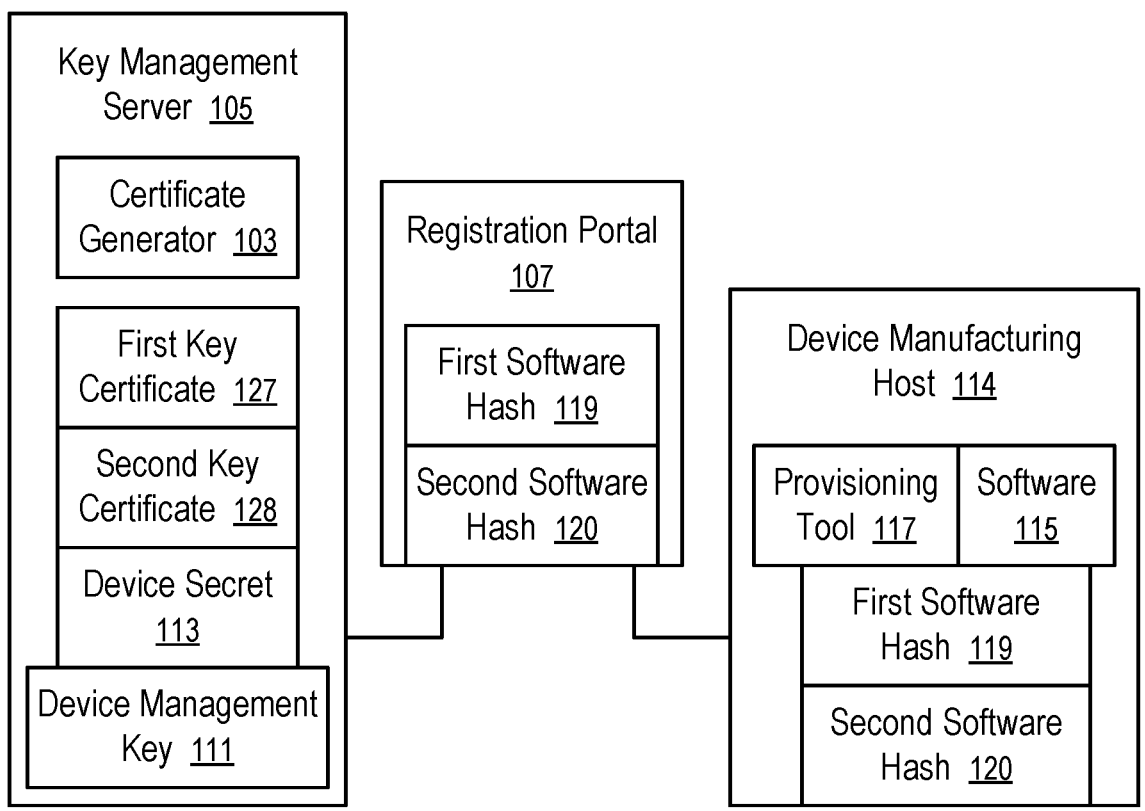

The information about the software (115) can be hashes (119 and 120) of the software (115) illustrated in FIG. 4. For example, the software hashes (119 and 120) can each be produced with cryptographic functions of the source code of the software (115). The first software hash (119) represents information of a first portion of software root-of-trust associated with the device manufacturer. The second software hash (120) represents information of a second portion of software root-of-trust associated with the device manufacturer.

In FIG. 4, the software hashes (119 and 120) used for the generation of keys in the device (101) are communicated to the key management server (105) via a registration portal (107) during the registration of the secure component (104) and its use with the software (115).

Figure 5:
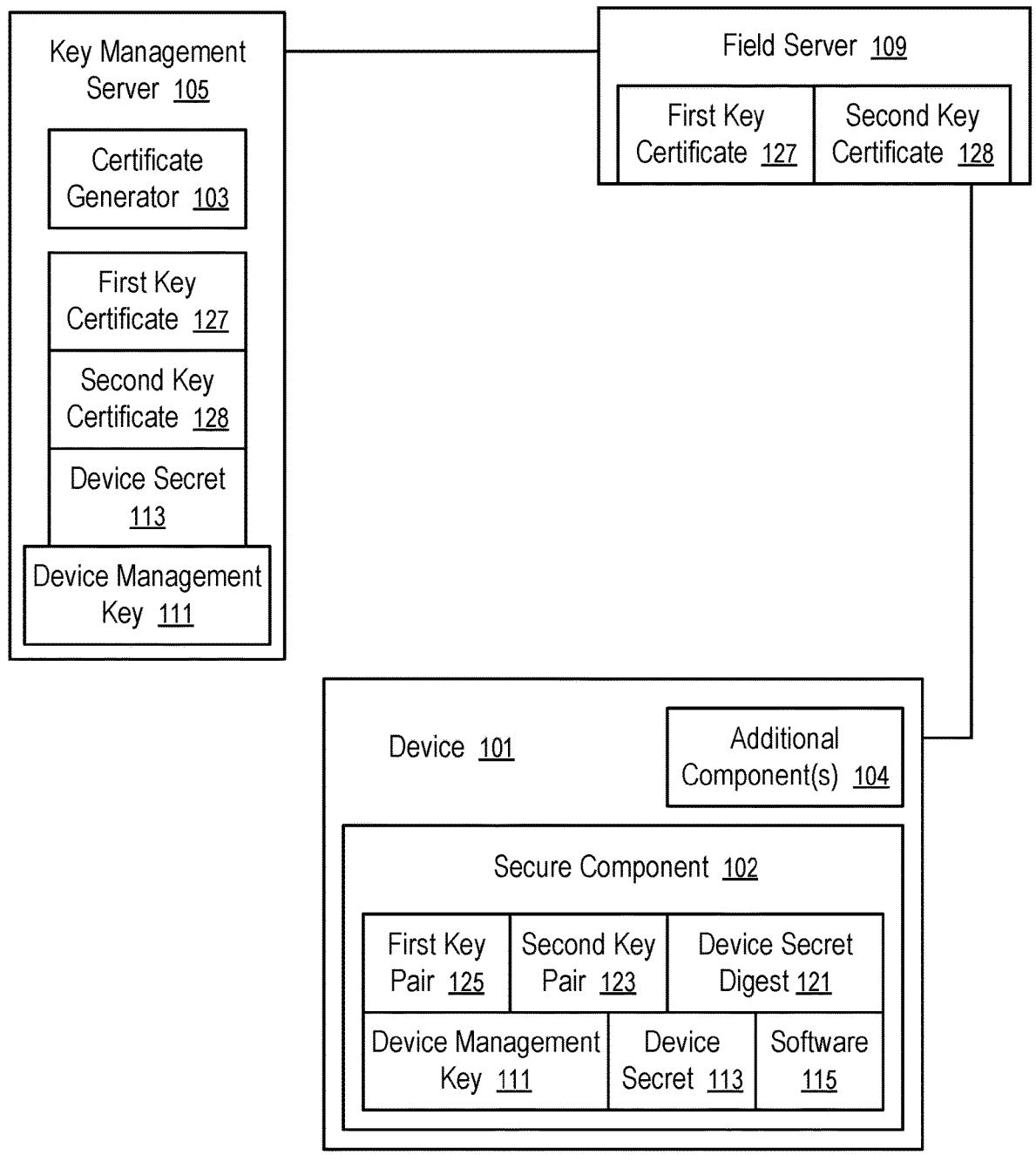

In FIG. 5, the certificate generator (103) uses the software hashes (119 and 120) to generate public keys of the device (101), independent of the operations of the device (101), and signs certificates (127 and 128) for the public keys of the device (101).

After the security feature of the secure component (102) is activated, the secure component (102) installed in the computing device (101) can be used in generating the device secret digest (121) of the computing device (101) and its cryptographic keys (e.g., 123 and 125).

The key management server (105) can provide the key certificate (127) of the computing device (101) to a server (109), enabling the server (109) to authenticate the device (101) based on the public key certified by the certificate generator (103) and messages signed by the device (101) using its corresponding private key.

Figure 6:
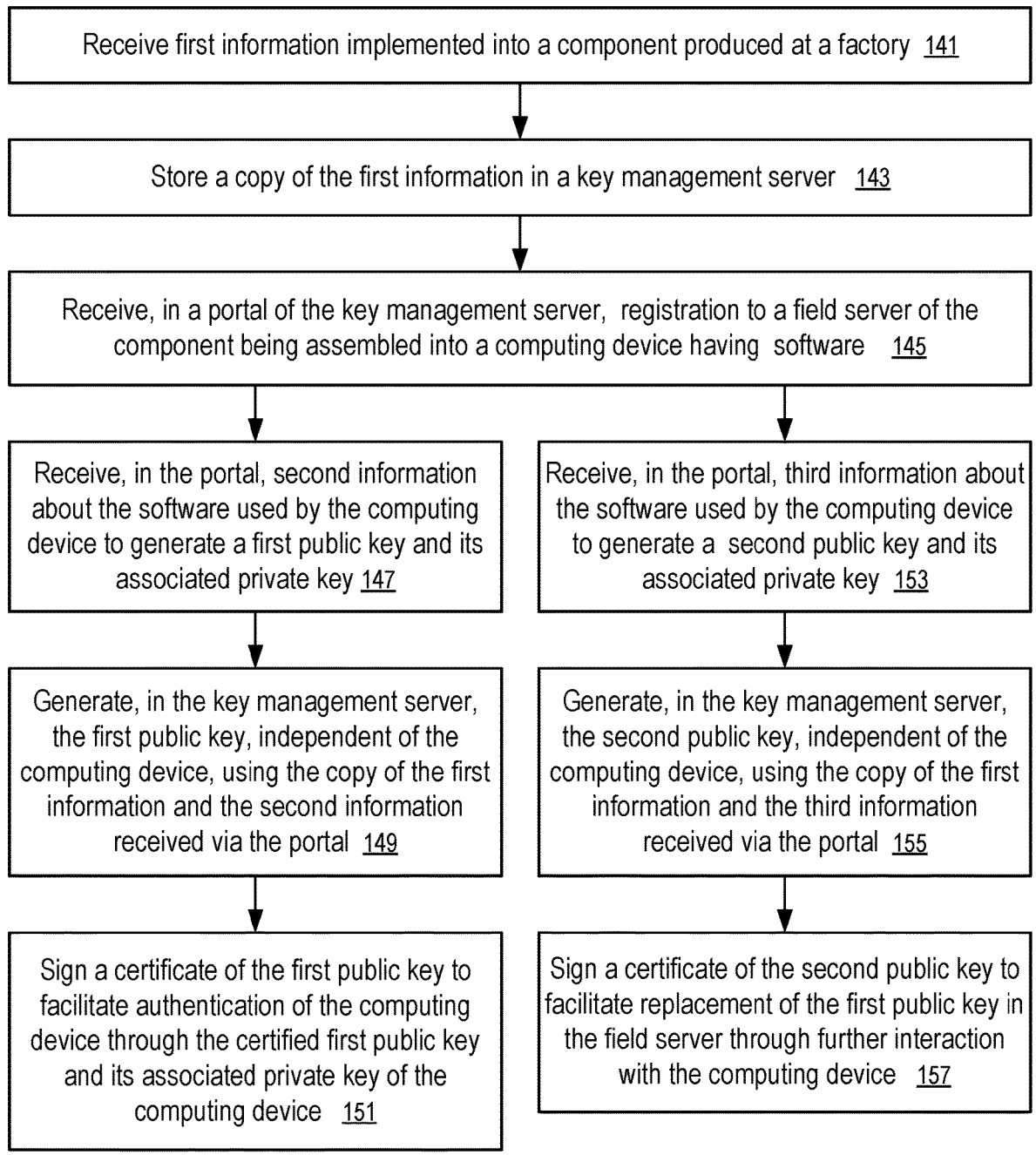
FIG. 6 shows a method to onboard software on a secure device according to one embodiment.

FIG. 6 shows a method to onboard software on a secure device according to one embodiment. For example, the method of FIG. 6 can be implemented in a system of FIG. 6 with a process illustrated in FIGS. 2-5.

At block 141, a key management server (105) receives first information implemented into a component (102) produced at a factory.

For example, the first information is unique to the component (102) amount components manufacturing in the factory.

For example, the first information can include a device secret (113) implemented in the hardware of the component (102) and/or a device management key (111) that can be used to manage the component (102).

For example, the first information can be received via a secure component host (112) while the component (102) is being produced in the factory.

For example, the component (102) can be a secure memory device (e.g., a secure flash memory device).

At block 143, the key management server (105) stores a copy of the first information.

After leaving the factory, the component (102) can be assembled into a computing device (101) that runs software (115). The factory may not have any information about the software (115). Information about the software (115) can be collected later during a registration process.

At block 145, a portal (107) of the key management server (105) receives registration of the component (102) being assembled into the computing device (101) having the software (115).

At block 147, the portal (107) receives second information about the software (115). The computing device (101) is configured to independently generate the second information about the software (115), and combining it with the first information implemented in the hardware of the component (102), to generate a key pair (123) (e.g., in accordance with a standard for DICE/RIoT).

At block 149, the key management server (105) generates the first public key of the computing device (101), independent of the computing device (101), using the copy of the first information stored in the key management server (105) and the second information received via the portal (107).

At block 151, a certificate generator (103) of the key management server (105) digitally signs a certificate of the first public key, using a private key of the certificate generator (103), to facilitate authentication through the certified public key and the private key of the key pair (123) of the computing device (101).

At block 153, the portal (107) receives third information about the software (115). The computing device (101) is configured to independently generate the third information about the software (115), and combining it with the first information implemented in the hardware of the component (102), to generate a key pair (125) (e.g., in accordance with a standard for DICE/RIoT).

At block 155, the key management server (105) generates the second public key of the computing device (101), independent of the computing device (101), using the copy of the first information stored in the key management server (105) and the third information received via the portal (107).

At block 157, a certificate generator (103) of the key management server (105) digitally signs a certificate of the first public key, using a private key of the certificate generator (103), to facilitate replacement of a key pair (123) of the computing device (101) through the certified public key and the private key of a key pair (125) of the computing device (101).

For example, a device manufacturing host (114) can be configured with a provisioning tool (117) for properly installing the software (115) into the computing device (101). The provisioning tool (117) can be configured to compute the second information about the software (115), which can be cryptographic hashes (119 and 120) of the software (115). The provisioning tool (117) can provide the second information (e.g., 119 and 120) about the software (115) to the registration portal (107), which can provide the certificate of the public key of the computing device (101) to the field server (109).

Upon successful registration of the component (102) having the first information (e.g., device secret (113)), the key management server (105) can provide the certificate (127) of the public key of the computing device (101).

The activation of the security feature with the device manufacturing host (114) allows the computing device (101) to compute the public key and private key of the computing device (101) (e.g., in accordance with a DICE/RIoT standard) and/or authenticate with the remote server (109) using the private key of the computing device (101).

Later during the lifetime of the device (101), a valid update can be conducted on the software (115), which can result in a change in a second software hash (120), but not in the first software hash (119). Consequently, this update causes a change in the second key pair (125), but not in the first key pair (123) generated by the secure component (102) and additional component(s) (104). The device can then use the unchanged key pair (125) to create a key replacement certificate by signing the changed public key, part of the second key pair (123). The key replacement certificate is then uploaded to the field server (109), which can use its second certificate (128) to authenticate its validity and upon success, replace its first key certificate (127) with the key replacement certificate. This process may be conducted according to DICE/RIoT standards.

Figure 7:
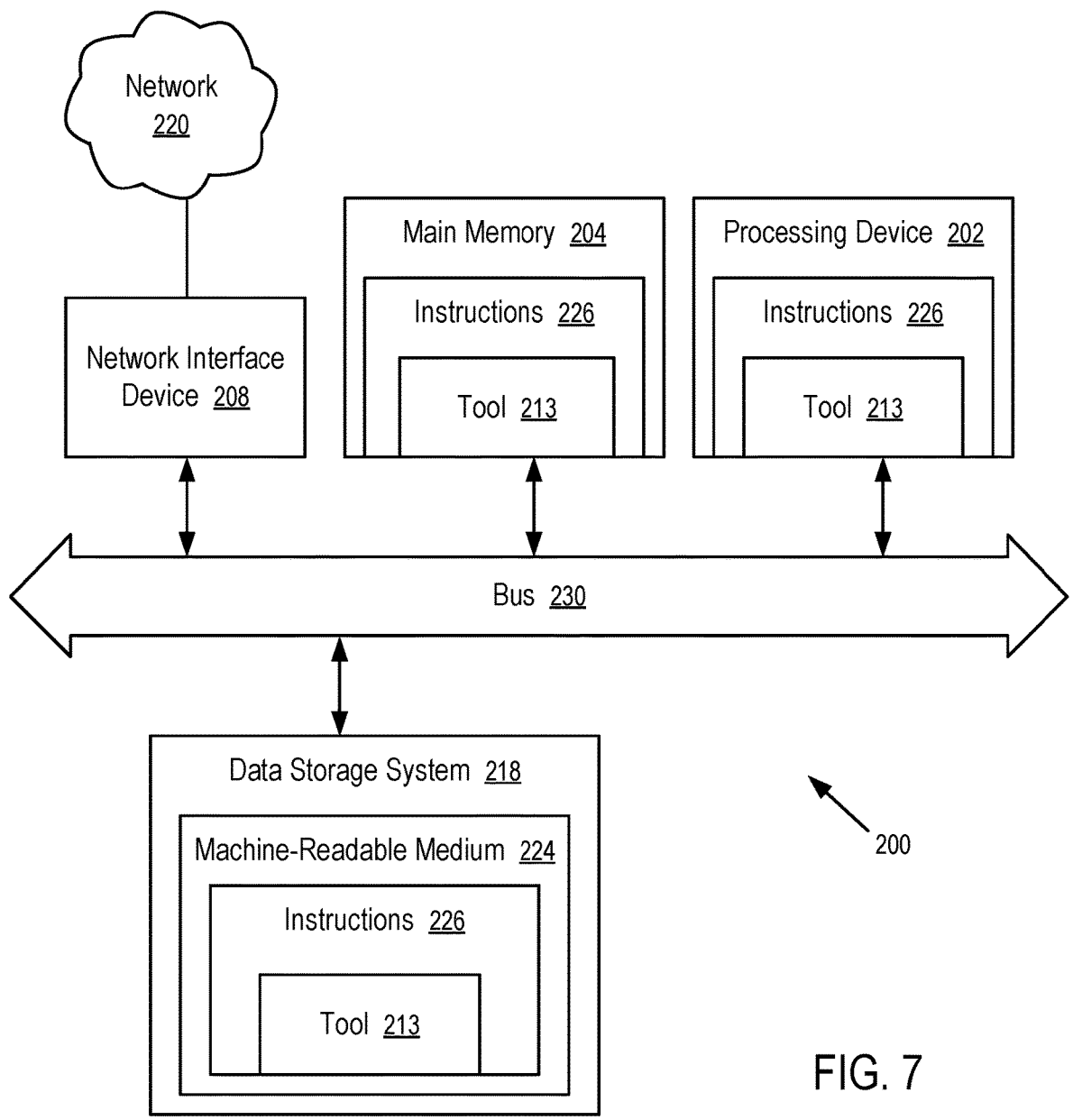
FIG. 7 is a block diagram of an example computer system in which embodiments of the present disclosure can operate.

FIG. 7 illustrates an example machine of a computer system (200) within which a set of instructions, for causing the machine to perform any one or more of the methodologies discussed herein, can be executed. In some embodiments, the computer system (200) can correspond to a computer system (e.g., the key management server (105), the registration portal (107), and/or the remote server (109) of FIG. 1) that includes, is coupled to, or utilizes a memory sub-system or can be used to perform the operations of a tool (213) disclosed in the herein, such as instructions to perform operations corresponding to the certificate generator (103), the registration portal (107), and/or a provisioning tool (117) described with reference to FIGS. 1-6. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system (200) includes a processing device (202), a main memory (204) (e.g., read-only memory (ROM), flash memory, dynamic random access memory (DRAM) such as synchronous DRAM (SDRAM) or Rambus DRAM (RDRAM), static random access memory (SRAM), etc.), and a data storage system (218), which communicate with each other via a bus (230) (which can include multiple buses).

Processing device (202) represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device (202) can also be one or more special-purpose processing devices such as an application specific integrated circuit (ASIC), a field programmable gate array (FPGA), a digital signal processor (DSP), network processor, or the like. The processing device (202) is configured to execute instructions (226) for performing the operations and steps discussed herein. The computer system (200) can further include a network interface device (208) to communicate over the network (220).

The data storage system (218) can include a machine-readable storage medium (224) (also known as a computer-readable medium) on which is stored one or more sets of instructions (226) or software embodying any one or more of the methodologies or functions described herein. The instructions (226) can also reside, completely or at least partially, within the main memory (204) and/or within the processing device (202) during execution thereof by the computer system (200), the main memory (204) and the processing device (202) also constituting machine-readable storage media. The machine-readable storage medium (224), data storage system (218), and/or main memory (204) can correspond to the memory sub-system 110 of FIG. 1.

In one embodiment, the instructions (226) include instructions to implement functionality corresponding to a tool (213) (e.g., the provisioning tool (117), software of the registration portal (107), software of the certificate generator (103), software of the key management server (105) described with reference to FIGS. 1-6. While the machine-readable storage medium (224) is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
   a key management server having a certificate generator; and
   a registration portal coupled to the key management server;
   wherein the key management server is configured to receive and store first information implemented into a component during manufacturing of the component;
   wherein the component is configured to be assembled into a computing device having software;
   wherein the registration portal is configured to receive registration information of the component being used with the software and to receive second information about the software;
   wherein the computing device is configured to generate an asymmetrical key pair from the first information and the second information.

2. The system of claim 1, wherein the registration portal is configured to receive, from a remote server, the second information about the software and provide the certificate of the public key to the remote server.

3. The system of claim 2, wherein the remote server is configured with a provisioning tool, the provisioning tool is configured to generate the second information about the software.

4. The system of claim 3, wherein the provisioning tool is configured to install the software in the computing device.

5. The system of claim 3, wherein the provisioning tool is configured to transmit the second information about the software to the registration portal.

6. The system of claim 3, wherein the provisioning tool is configured to activate a feature in the component in accordance with the registration information.

7. The system of claim 6, wherein after the feature in the component is activated, the computing device is capable of authenticating with the remote server using the private key of the computing device.

8. The system of claim 6, wherein after the feature in the component is activated, the computing device is capable of computing the asymmetrical key pair.

9. The system of claim 8, wherein the computing device is configured to generate the asymmetrical key pair in accordance with a standard.

10. The system of claim 8, wherein the first information is unique to the component among components manufacturing in a factory.

11. The system of claim 10, wherein the component includes a memory device.

12. A method, comprising:
    receiving and storing, in a key management server, first information implemented in a component during manufacturing of the component, wherein the component is configured to be assembled into a computing device;
    receiving, in a registration portal coupled to the key management server, registration information of the component;
    receiving, in the registration portal, second information, wherein the computing device is configured to generate an asymmetric key pair from the first information and the second information, the asymmetric key pair including a public key of the computing device and a private key of the computing device; and
    generating, in the key management server and independent of the computing device, the asymmetric key pair from the first information stored in the key management server and the second information received via the registration portal.

13. The method of claim 12, further comprising:
    providing, by the registration portal, the certificate of the public key to a remote server that provides the second information.

14. The method of claim 13, further comprising:
    configuring a provisioning tool in the remote server, the provisioning tool is configured to generate the second information, and transmit the second information about the software to the registration portal.

15. The method of claim 14, further comprising:
    activating, by the provisioning tool, a feature in the component in accordance with the registration information.

16. The method of claim 15, wherein activation of the feature in the component enables the computing device to authenticate with the remote server using the private key of the computing device.

17. The method of claim 15, wherein activation of the feature in the computing device enables the computing device to compute the asymmetric key pair.

18. The method of claim 17, wherein the computing device is configured to generate the asymmetric key pair in accordance with a standard.

19. The method of claim 18, wherein the first information is unique to the component among components manufacturing in a factory; and the component includes a flash memory device.

20. A non-transitory computer storage medium storing instructions which, when executed in a computer system, cause the computer system to perform a method, the method comprising:

receiving and storing, in a key management server, first information implemented in a component during manufacturing of the component, wherein the component is configured to be assembled into a computing device;

receiving, in a registration portal coupled to the key management server, registration information of the component;

receiving, in the registration portal, second information, wherein the computing device is configured to generate an asymmetric key pair from the first information and the second information, the asymmetric key pair including a public key of the computing device and a private key of the computing device; and generating, in the key management server and independent of the computing device, the asymmetric key pair from the first information stored in the key management server and the second information received via the registration portal.

\* \* \* \* \*